United States Patent [19]

Beck

[11] 3,812,918

[45] May 28, 1974

[54] GANGED SOD HARVESTING APPARATUS

[76] Inventor: Martin Beck, P.O. Box 752, Auburn, Ala. 36830

[22] Filed: Dec. 12, 1972

[21] Appl. No.: 314,310

Related U.S. Application Data

[63] Continuation-in-part of Ser. No. 149,624, June 3, 1971, abandoned, which is a continuation-in-part of Ser. No. 57,933, July 24, 1970, Pat. No. 3,747,686, which is a continuation-in-part of Ser. No. 605, Jan. 5, 1970, abandoned.

[52] U.S. Cl. ................................................ 172/19
[51] Int. Cl. ............................................ A01b 45/04
[58] Field of Search ......... 172/19, 20, 57, 101, 776; 56/6

[56] References Cited
UNITED STATES PATENTS 3,267,651   8/1966   Engler.................................... 56/6
3,357,499  12/1967   Finnyfrock............................ 172/19
3,509,944   5/1970   Brouwer et al. ...................... 172/19

Primary Examiner—Stephen C. Pellegrino
Attorney, Agent, or Firm—Jones & Lockwood

[57] ABSTRACT

Apparatus for harvesting a plurality of continuous strips of sod, each of uniform thickness, the apparatus comprising a plurality of sod cutters with a central drive means wherein the sod cutters are ganged together. Ganging is accomplished by means of connecting bars and links whereby each cutter is able to move in the vertical direction independently of its interconnected cutters without causing undue wear on, or distortion of its connecting members or drive means. The apparatus is further provided with stabilizer arms which prevent movement of the upper portion of each unit with respect to adjacent units in the direction of travel of the ganged sod harvesting apparatus.

9 Claims, 3 Drawing Figures

GANGED SOD HARVESTING APPARATUS

CROSS-REFERENCES TO RELATED APPLICATIONS

This application is a continuation-in-part of copending application Ser. No. 149,624 filed June 3, 1971, now abandoned. Application Ser. No. 149,624 is a continuation-in-part of co-pending application Ser. No. 57,933 filed July 24, 1970 now U.S. Pat. No. 3,747,686, issued July 24, 1973. Application Serial No. 57,933 is a continuation-in-part of application Ser. No. 605 filed Jan. 5, 1970, now abandoned. The teachings therein are incorporated herein by reference.

FIELD OF THE INVENTION

The invention relates, in general, to a ganged sod harvesting apparatus and in particular to means for so ganging a plurality of sod harvesting units that the individual outboard cutters are free to move in the vertical direction independently of the remaining cutters without subjecting their connecting and driving means to abnormal or undue stress and wear. Ganging of the individual cutters is accomplished by use of a plurality of connecting links and bars which allow independent vertical movement of each cutter unit, but which are of sufficient strength to maintain a uniform depth of sod cutting by each unit where the apparatus encounters bumps or mounds in the course of its travel. The apparatus is further provided with stabilizer arms which restrict movement of the upper portions of the outboard cutters in the direction of travel of the harvesting apparatus and which act to dampen the inherent vibrations caused by the reciprocatory motion of the cutter bars themselves as they reciprocate in the direction of travel of the apparatus.

DESCRIPTION OF THE PRIOR ART

The use of squares or strips of sod for landscaping and similar purposes is becoming increasingly popular due to the inherent savings in labor and time allowed by the use of such sod in comparison to the time and expense involved in raising new grass. The sod to be used has been harvested by use of a cutting apparatus which cuts a strip of sod that is then cut into squares, folded into bundles or, as described in the prior and co-pending applications listed above, the strip of sod preferably is wrapped about a reel for ease of handling. Since it was thought advantageous, from a point of reduced labor costs, to cut as wide a strip of sod as possible, early sod cutters were made with one wide cutting blade. This soon proved unfeasable due to the variations in thickness of sod cut and to the unacceptable vibrations set up by the reciprocating subsurface cutter blade. To rectify these problems, while still allowing a large amount of sod to be cut in one travel of the machine, a plurality of smaller cutting units were ganged or connected together in a generally side by side relationship as shown in applicant's co-pending application Ser. No. 149,624, now abandoned. As seen in this prior application, a plurality of cutting apparatuses were ganged together in such a way that adjacent reciprocating cutter bars did not interfere with each other since they were positioned in an out of line relationship with respect to each other.

The ganging of sod cutters creates several problems which must be overcome for the apparatus to function acceptably. The primary problem is one of wear on the connecting means and also on the means which transmit power from the central drive means to the outboard cutters. Since it is very desirable to have an uniform thickness of sod cut by each unit, even when being used on other than flat ground, a simple hinge connection between units is not satisfactory. The several units must be free to move in the vertical direction independently of each other, while maintaining their side-by-side relationship. Previous methods of connecting sod harvesting units have also been unsatisfactory since they tended to allow twisting of each unit about its connecting means. When one corner of the unit rose, the diagonal corner would drop, thus causing twisting of the connecting means and the power transmitting means. In addition, this twisting action tends to vary the thickness of the sod being cut with consequential waste of sod. The drag of the cutters through the sod also tends to cause the outer ends of the outboard cutters to deviate from their proper positions thus causing additional wear on the connecting and drive means. An additional problem is created by the movement of the reciprocating cutter blades. This reciprocatory motion causes vibration in the units which again tends to weaken the connecting and driving means and also causes variations in sod thickness.

The simple hinge connections which are used in ganging lawn mowers, disc harrows and the like have proved unsatisfactory in ganging sod cutting units together. This connecting means lacks sufficient strength and rigidity to prevent bending and twisting of sod cutter units and therefore subjects the apparatus to undue wear and failure. This simple hinge connection has also proved unsatisfactory since it does not allow each cutter to move vertically independently of the other cutters. Another problem with the use of simple hinge pin connections that is not encountered in the ganging of lawn mowers and similar devices is that it does not dampen the vibration set up by the reciprocating cutter blades. The simple hinge type connection also lacks the ability to stop the motion of the upper portion of each cutter unit caused by the reciprocating blade and thus allows additional variations in sod thickness.

SUMMARY OF THE INVENTION

The present invention overcomes the probjems encountered in the prior art devices and provides a connecting structure which may be used to gang a plurality of sod cutters together. The connecting structure is sturdy, reliable, and inexpensive and allows the ganging of multiple sod cutters in a satisfactory manner.

The ganging means facilitates the joining together of several sod cutting units, thus allowing the cutting of several strips of sod during operation of the apparatus. The width of sod cut may be varied by changing the width of the cutter blades or by varying the number of machines joined together. The ganging together of the individual cutters also overcomes the problems caused by using one large cutter blade and thus allows use of the machine on uneven ground.

Ganging of, for example, three units is accomplished by use of connecting links between the central unit and each outboard unit. These connecting links are fixedly attached to the ends of a rotatable shaft on the central unit and to the ends of a fixed shaft on the outboard unit. In this manner, the outboard unit is so ganged to the central unit that it may move in a vertical plane independently of the center unit with the rotatable shaft acting as a pivot for such motion. This connecting structure is also of sufficient rigidity and the connecting links are keyed to the rotatable shaft in such a manner that the shaft acts as a torsion bar and enables each unit to rise or fall while remaining relatively free from twisting or bending. Movement of one portion of each cutter unit will cause a corresponding movement of the rest of each cutter unit, thereby reducing wear due to twisting and bending.

In addition, movement of the upper portion of each outboard cutter unit in a horizontal plane with respect to the upper part of the central unit, i.e., in the direction of travel of the apparatus, is restricted by means of a stabilizer arm which connects the center unit to the upper portion of each outboard cutter unit. The stabilizer arm also acts to dampen vibrations caused by the reciprocating cutter bar and helps insure uniform cutting thickness. This arm additionally acts to keep the cutter unit in proper position as it travels over mounds or depressions and thereby alleviates the twisting movement which causes undue wear on the connecting and drive means.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

DESCRIPTION OF A PREFERRED EMBODIMENT

Figure 1:
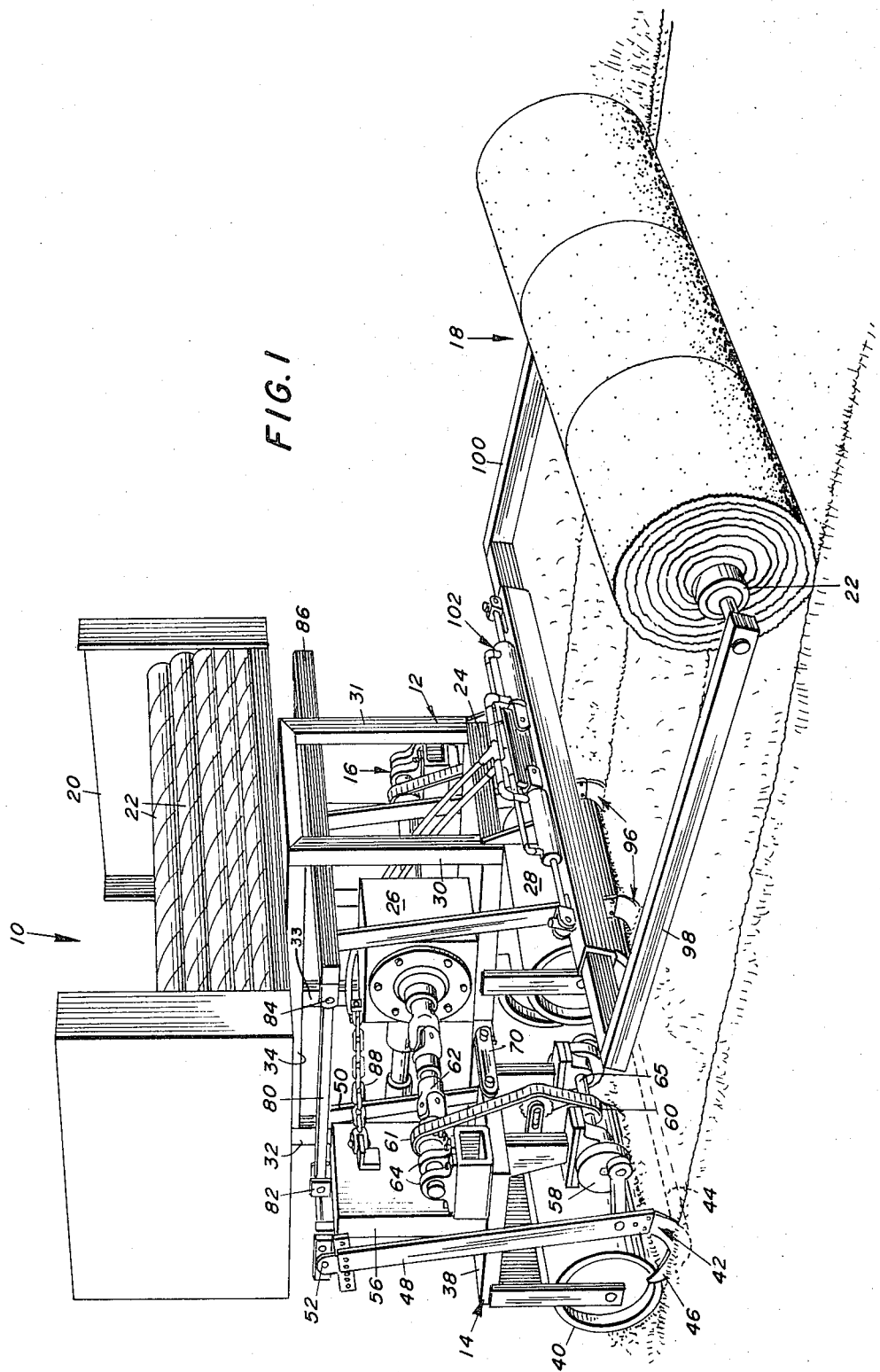
FIG. 1 is a perspective view of a preferred embodiment of the invention.
Figure 2:
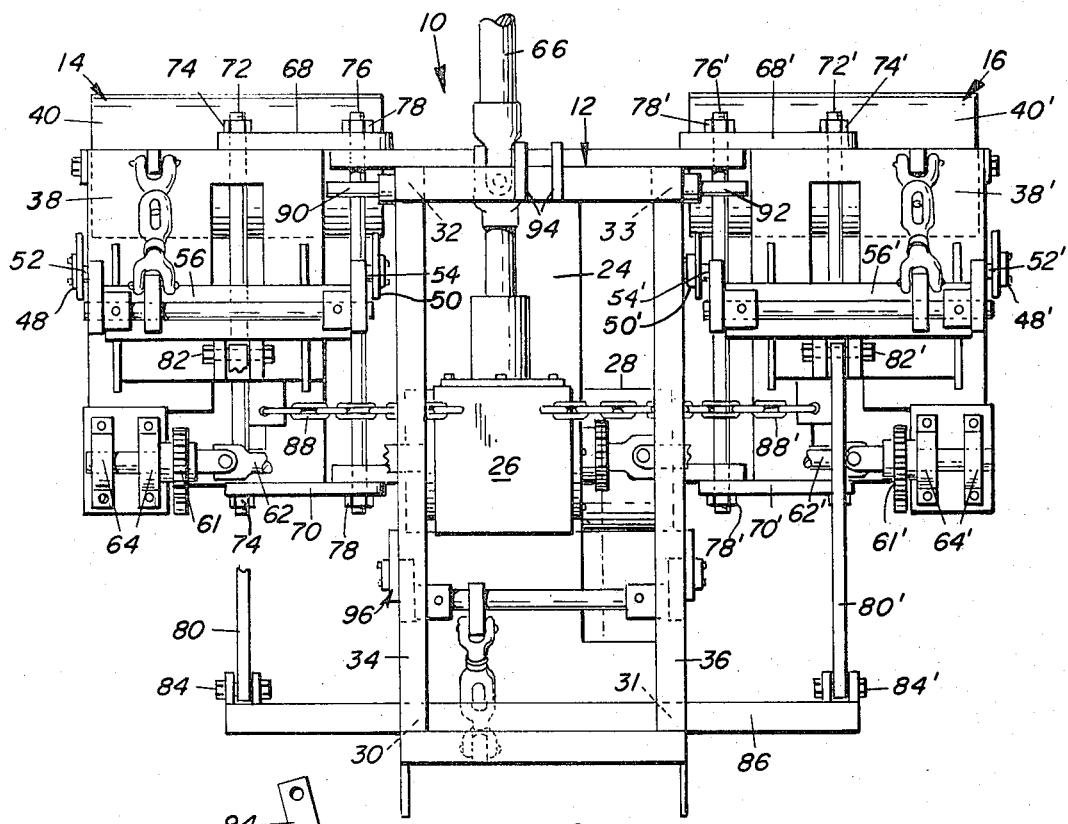
FIG. 2 is a top plan view of the ganged sod cutters with parts omitted for the sake of clarity.

Referring now to FIGS. 1 and 2 there is generally indicated at 10 a ganged sod harvesting apparatus which is comprised of a center cutter unit 12, left and right outboard cutter units 14 and 16, and a sod collecting assembly 18. Ganged sod harvesting apparatus 10 is also provided with a bin 20 as seen in FIG. 1 for storage of a plurality of hollow cardboard or metal tubes 22 for use with sod collecting assembly 18.

As seen in FIG. 2, left and right outboard cutter units 14 and 16 are mirror images and are connected to the center cutter unit 12 in the same manner. Therefore, only left cutter unit 14 and its connections to center cutter unit 12 will be hereinafter described, it being understood that the right cutter unit 16 is in all respects similar to left cutter unit 14 and with equivalent parts on the right cutter unit being numbered with primed numbers corresponding to similar parts in left cutter unit 14.

As seen in FIG. 1 center cutter unit 12 is comprised of a generally rectangular support platform 24 upon which is mounted gear drive unit 26 and which is supported above the ground by roller 28. Roller 28 may be adjustable so as to vary the height of platform 24 above the ground. Attached to support platform 24 are uprights 30 – 33 and horizontal members 34 and 36 which form a frame to provide support for bin 20. Outboard cutter unit 14 is also comprised of a horizontal rectangular support platform 38 supported above the ground by roller 40. Roller 40 may be adjustable to vary the height of platform 38 above the ground.

As may be seen in FIG. 1, and as more fully described in applicants co-pending application Ser. No. 149,624 filed June 3, 1971, now abandoned outboard cutter unit 14 is provided with sod cutting apparatus 42 which is comprised of a transverse subsurface cutting blade 44 (shown in dashed lines in FIGS. 1 and 3) attached at its ends to vertical cutting blades 46 which serve to define the edges of the sod strips being cut. Cutting blades 46 are joined to cutter unit 14 by means of arms 48 and 50 which are pivotally attached at 52 and 54 to the upper portion of a vertical frame member 56 of cutter unit 14. Cutter bar 44 is driven by means of a cam drive mechanism 58 connected by means of suitable drive links to arms 48 and 50. Cam drive mechanism 58 is, in turn, driven by a chain drive unit 60 which includes a drive sprocket 61 secured to a drive shaft connected through suitable flexible connecting means such as a universal joint 62 to the gear drive unit 26 located on center cutter unit 12. Chain drive unit 60 is supported by conventional pillow-block bearings 64 affixed to the rectangular support plate 38 of cutter unit 14 and serves to transmit power from the gear drive unit 26 to the cam mechanism 58 through a cam shaft 65. As previously indicated, this cutting apparatus and drive mechanism is more fully described in applicant's co-pending application Ser. No. 149,624 filed June 3, 1971, now abandoned. As may be seen in FIGS. 2 and 3, gear drive unit 26 is driven by means of a shaft 66 which may be attached to the power take-off unit of a conventional tractor (not shown).

Outboard cutter unit 14 is ganged or connected to center cutter unit 12 by a forward link 68 and a rear link 70 as seen in FIGS. 1 and 2. Each of the links 68 and 70 is pivotally attached at one end to a rod 72 which is, in turn, fixedly attached, for example by welding, to platform 38 of outboard cutter unit 14. Shaft 72 as seen in FIG. 2 extends substantially the whole length of platform 38 and may be provided with threaded portions at its ends which receive nuts 74 to secure the links 68 and 70 to the shaft, the shaft extending through apertures provided in the links. Links 68 and 70 are each attached, at their inner ends, to the center cutter unit 12 by means of a pivotable shaft 76 which passes through apertures in the ends of the links. The links 68 and 70 are secured to the pivotable shaft 76 by means of nuts 78 and are prevented from rotating with respect to the shaft by means of keys and keyways (not shown) in shaft 76 and in the link apertures.

Links 68 and 70 and rod 76 are of sufficient strength to act as a torsion transmitting means such that a movement of one portion of cutter unit 14 in the vertical direction about the pivot axis of shaft 76 will cause a corresponding vertical movement in the remainder of the unit. Because of the torsional strength of shaft 76, and since links 68 and 70 are keyed to pivotable shaft 76, a rotation of one end of shaft 76 will cause a similar rotation of the other end of the shaft and a corresponding movement of its connected link. The connecting apparatus is such that the outboard cutter unit will be free to move in the vertical direction independently of movement of the central cutter unit.

Figure 3:
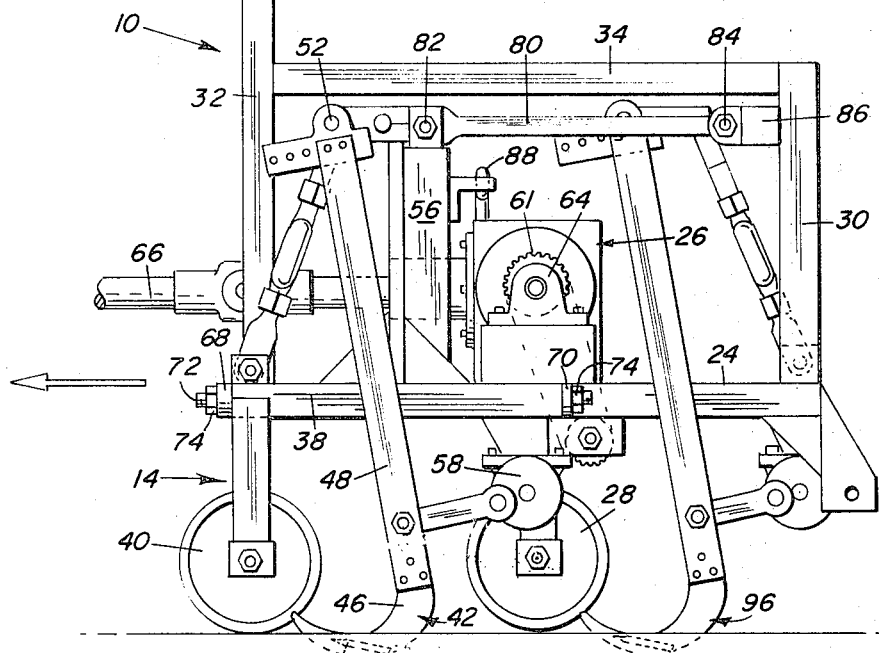
FIG. 3 is a side elevation view of the ganged sod harvester again with portions removed for the sake of clarity.

As seen most clearly in FIGS. 1 and 3, outboard cutter unit 14 is also connected to the central cutter unit 12 by means of a stabilizer arm 80 which is pivotally attached at 82 to the upper portion of vertical member 56 on outboard cutter unit 14 by any conventional means, and at 84 to a horizontal stabilizer bar 86 which is fixedly attached to uprights 30 and 31 on center cutter unit 12. Stabilizer arm 80 acts to restrict movement, in the direction of travel of sod harvester 10, i.e., in the horizontal plane, of the upper portion of outboard cutter unit 14 and also acts to dampen vibrations caused by the reciprocatory motion of transverse cutter bar 44. It will be seen from FIG. 1 that the cutter apparatus 42 is pivotally attached at 52 to the top of the outboard cutter unit 14, so that the force of the reciprocating motion of the cutter bar as it cuts sod is transferred to the top of the unit, and tends to move the top of unit 14 forward and back with respect to the center unit 12. The stabilizer arm 80 prevents this motion.

As shown in FIGS. 1 and 2, outboard cutter unit 14 is also secured to central cutter unit 12 by means of a chain 88 which provides additional support for outboard cutter unit 14 in the event that the entire harvester 10 is raised from the ground to facilitate transportation. Additionally center cutter unit 12 is provided at its forward portion with conventional means 90, 92, and 94 which engage a conventional three point hitch on a tractor (not shown).

It will be understood that center cutter unit 12 as seen in FIG. 1 is provided with a sod cutting apparatus and a cam drive mechanism similar to those of left and right cutter units 14 and 16 respectively, with the only change being in the location of the assemblies on the center cutter unit. As shown in FIG. 1, the center sod cutting apparatus generally indicated at 96 is located toward the rear of center cutter unit 12 so as to permit cutter blades of side and center units to track without interfering with each other.

In operation, the ganged sod harvester 10 is connected to the rear of a conventional tractor by means of its three point hitch. Shaft 66 is then joined to the tractor's power take-off unit. As the tractor moves ahead, the cutter bars 44 are caused to reciprocate by their previously described drive means, thus cutting a plurality of strips of sod which are then collected by sod collecting apparatus 18. As seen in FIG. 1, and as more fully described in applicant's co-pending application Ser. No. 57,930 filed July 24, 1970, sod collecting apparatus 18 is comprised of slideable arms 98 and 100 which form a generally U shaped structure, and which are moveable by hydraulic assembly 102 so as to secure a tube 22 between them, and to then release the tube when a predetermined amount of sod has been rolled on it.

Thus it will be seen that a ganged sod harvesting apparatus has been provided wherein the outboard cutter units are so attached to the center cutter unit as to allow them to have independent movement in the vertical direction, thereby assuring uniformity in sod thickness, while yet insuring adequate strength to prevent undue wear on the connecting members or the drive members themselves. Provision is also made for dampening vibrations caused by the reciprocatory motion of the cutter bar and for restraint on movement of the upper portions of the outboard cutter units.

It will be obvious to one of ordinary skill in the art that modifications such as providing various pivotal connecting means may be made without departing from the true spirit and scope of the invention and that therefore the scope of the invention is to be limited only by the appended claims.

I claim:

1. In an apparatus for simultaneously harvesting a plurality of strips of sod, said apparatus being comprised of at least first and second adjacent cutting units, each of said cutting units including a ground engaging support, a frame carried by said support, an elongated cutting bar mounted to said frame for reciprocatory movement, and means for reciprocating said cutting bar in the longitudinal direction of movement of said apparatus; the improvement comprising means for ganging together said adjacent cutting units, said ganging means including:

linking means secured to and extending between said adjacent cutting units for ganging together said adjacent cutting units so as to allow freedom of movement of each said unit in the vertical direction; and, stabilizing means secured to and extending between said adjacent cutting units for restricting longitudinal movement of an upper portion of said frame of each said unit with respect to an upper portion of said frame of said adjacent unit.

2. The apparatus of claim 1 wherein said linking means comprises first and second spaced connection points fixedly attached to said first cutter unit, a longitudinally directed rotatable shaft secured to said second cutter unit, and connecting means between said spaced connection points and said rotatable shaft.

3. The apparatus of claim 2 wherein said first and second spaced connection points are the ends of a longitudually directed shaft fixedly attached to said first cutter unit.

4. The apparatus of claim 1 wherein said stabilizing means is comprised of a rigid arm pivotally affixed to the upper portions of said frames of said first and second cutter units whereby horizontal motion of said upper portions of said frames of said cutter units with respect to each other is eliminated.

5. In an apparatus for simultaneously harvesting a plurality of strips of sod, said apparatus being comprised of at least first and second adjacent cutting units, each of said cutting units including a ground engaging support, a base carried by said support, an elongated cutting bar pivotably mounted to an upper portion of said base for substantially reciprocatory movement in the longitudinal direction of movement of said apparatus, and means mounted to said base and responsive to a power input for reciprocating said cutting bar in said longitudinal direction; the improvement comprising means for ganging together said adjacent cutting units, said ganging means including:

first and second spaced connection points fixedly attached to said first cutting unit;

a longitudinally directed shaft rotatably secured to said second cutting unit;

means for linking said first connection point to one end of said shaft and means for linking said second connection point to a second end of said shaft; and, means secured to and extending between said adjacent cutting units for restricting movement of said upper portion of said base of said first cutting unit with respect to the upper portion of base of said second cutting unit in said longitudinal direction of movement of said apparatus.

6. The apparatus of claim 5 wherein said first and second spaced connection points are the ends of a longitudinally directed shaft fixedly secured to said first cutting unit.

7. The apparatus of claim 5 wherein said means for linking said first spaced connection point to said one end of said shaft and said means for linking said second spaced connection point to said second end of said shaft comprises first and second connecting links each said connecting link being moveably attached at one end thereof to one of said spaced connecting means, each said connecting link being fixedly attached at its other end to one of said shaft ends.

8. The apparatus of claim 5 wherein said means for restricting movement of said upper portion of said base of said first cutting unit comprises a rigid stabilizer arm pivotally affixed at its first end to said upper portion of said first cutting unit and pivotally affixed at its second end to said upper portion of said base of said second cutting unit whereby said relative longitudinal movement of said upper portion of said base of said first cutter unit with respect to said upper portion of said base of said second cutter unit is restricted.

9. The apparatus of claim 5 wherein there are ganged together three said adjacent cutting units.

* * * * *